United States Patent Office 3,839,363
Patented Oct. 1, 1974

---

3,839,363
SYNTHESIS OF ZEARALANONE AND RELATED COMPOUNDS AND INTERMEDIATES USEFUL IN THE SYNTHESIS THEREOF
Dinubhai H. Shah and Richard Nelson Hurd, Terre Haute, Ind., assignors to Commercial Solvents Corporation, New York, N.Y.
No Drawing. Filed Apr. 25, 1972, Ser. No. 247,351
Int. Cl. C07d 9/00, 7/26
U.S. Cl. 260—343.2 R    15 Claims

ABSTRACT OF THE DISCLOSURE

This invention provides a new synthesis for zearalanone and related compounds which related compounds and zearalanone are represented by the formula:

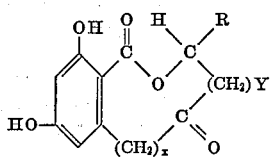

where X is an integer having a value from 3 to 8 inclusive, where Y is an integer having a value from 1 to 6 inclusive, and where R is chosen from the group consisting of methyl, ethyl, isopropyl and propyl.

---

The anabolic agent (R,S)-zearalanone, in which X=5, Y=3, and R=$CH_3$ in the foregoing formula, is prepared by a total chemical synthesis involving the condensation of dimethyl β-oxoglutarate under the influence of metallic sodium to give dimethyl 4-carboxy-3,5-dihydroxyhomophthalate; de-carboxylating said homophthalate to prepare dimethyl 3,5-dihydroxyhomophthalate; benzylating the foregoing homophthalate to yield dimethyl 3,5-bis(benzyloxy)homophthalate; reaction of the product formed with 4-benzyloxybutyraldehyde to form a mixture of 6-(5-benzyloxy - 1 - carbomethoxy - 1 - penten-1-yl)-2,4-bis (benzyloxy)benzoic acid and 3-(3-benzyloxypropyl)-4-carbomethoxy-6,8-bis(benzyloxy) - 3,4 - dihydroisocoumarin; reaction of said mixture with sodium methylate and then with acid to yield 6-(5-benzyloxy-1-carbomethoxy-1-penten-1-yl)-2,4-bis(benzyloxy)benzoic acid; reacting said benzoic acid successively with alkali and acid to produce α-(4-benzyloxybutylidene)-3,5-bis(benzyloxy) homophthalic acid mixed with sodium salts; heating said mixture and decarboxylating the acid to yield 2,4-bis (benzyloxy)-6-(5 - benzyloxy-1-penten-1-yl)benzoic acid; reacting said acid successively with thionyl chloride and 5-chloro-2-pentanol to produce 4-chloro-1-methylbutyl 2,4-bis(benzyloxy)-6-(5-benzyloxy - 1 - penten-1-yl)benzoate; reacting said benzoate with hydrogen to prepare 4-chloro-1-methylbutyl 2,4 - dihydroxy-6-(5-hydroxypentyl) benzoate; reacting said benzoate successively with benzyl chloride and thionyl chloride to produce 4-chloro-1-methylbutyl 2,4-bis(benzyloxy)-6-(5-chloropentyl)benzoate; reacting this benzoate ester with sodium cyanide to prepare 4-cyano-1-methylbutyl 2,4-bis(benzyloxy)-6-(5-cyanopentyl)benzoate; reacting said benzoate with anhydrous mineral acid, methanol, and then with water to produce 4-carbomethoxy-1-methylbutyl 2,4-bis(benzyloxy)-6-(5-carbomethoxypentyl)benzoate; subjecting said benzoate to the action of sodium bis(trimethylsilyl)amide to yield a mixture of (R,S)-5'-carbomethoxy-2,4-bis(benzyloxy)zearalanone and (R,S) - 7' - carbomethoxy-2,4-bis (benzyloxy)zearalanone; reacting said mixture with alkali to prepare (R,S)-2,4-bis(benzyloxy)zearalanone; and reacting said zearalanone derivative with hydrogen to produce (R,S)-zearalanone.

In general, a homologue of (R,S)-zearalanone is prepared by substituting for 4-benzyloxybutyraldehyde in the foregoing sequence of reactions a compound represented by the formula:

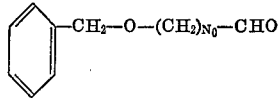

where $N_0$ is an integer which may have the value, 1, 2, 4, 5, or 6.

A further series of homologues of (R,S)-zearalanone is prepared by substituting for 5-chloro-2-pentanol in the foregoing sequence of reactions a compound represented by the formula:

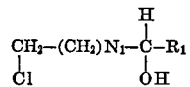

where $N_1$ is an integer which may have the value 0, 1, 3, 4, or 5 and where $R_1$ may be ethyl, isopropyl or propyl.

The invention also covers novel intermediates useful in the synthesis of (R,S)-zearalanone and its homologues and processes for making these intermediates.

More particularly, this invention relates to a new and improved process for the total chemical synthesis of (R,S)-zearalanone starting from citric acid, a cheap and readily available organic acid, and to novel intermediates produced in said synthesis, and to processes for making these intermediates.

It is an object of the present invention to provide a new synthesis of zearalanone and of a number of homologues of zearalanone.

It is another object of the present invention to provide new intermediates useful in the preparation of zearalanone and its homologues.

It is a further object of the present invention to provide new processes for producing intermediate compounds useful in the synthesis of zearalanone and its homologues.

It is a specific object to provide a method for synthesizing zearalanone from citric acid.

CROSS REFERENCE TO RELATED APPLICATIONS

None.

BRIEF SUMMARY OF THE INVENTION

This invention covers a new and improved process for the chemical synthesis of the polysiologically active macrolide, (R,S)-zearalanone (i.e. (R,S)-6-(10'-hydroxy-6'-oxoundecyl)-β-resorcylic acid lactone), represented by the formula:

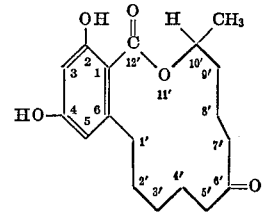

The invention also covers homologues of (R,S) - zearalanone represented by the formula:

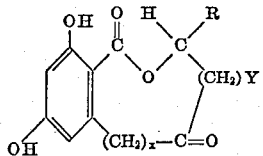

where X is an integer which may have the values 3, 4, 6, 7, or 8, and where Y is an integer which may have the value 1, 2, 4, 5, or 6, and where R is chosen from the group consisting of ethyl, isopropyl, and propyl.

DETAILED DESCRIPTION (R,S) - zearalanone and its homologues are useful as anabolic agents in the production of animals such as sheep and cattle. One of the isomers of (R,S)-zearalanone, (S)-zearalanone, was produced by the hydrogenation of (S)-zearalanone which in turn was made by a fermentation process using the organism *Gibberella zeae* (Gordon) as described in U.S. Pat. 3,169,019.

The present invention is based upon the discovery that (R,S)-zearalanone and its homologues can be readily prepared by the sequence of reactions exhibited in Chart I. The specific intermediates set forth in Chart I lead to the synthesis of (R,S)-zearalanone. Homologues of (R,S)-zearalanone can be readily prepared by the proper choice of reactants in the steps V to VI and VIII to IX of Chart I. For example, use of 3-benzoxypropionaldehyde in the step V to VI and use of 5-chloro-3-pentanol in step VIII to IX yields the homologue of (R,S)-zearalanone represented by the formula:

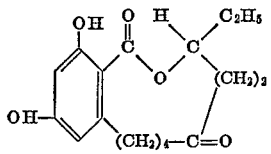

All of the reactions have been found to proceed in a straightforward manner and they require nothing other than apparatus and equipment found in the conventional chemical laboratory.

Citric acid is the starting material for the sequence of reactions exhibited in Chart I. It is treated with chlorosulfonic acid to produce β-oxoglutaric acid I which is then converted to its dimethyl ester II by reaction with methanol. Under the influence of metallic sodium this ester is condensed to yield dimethyl 4-carboxy-3,5-dihydroxyhomophthalate III which, on heating in a menstruum of dimethylformamide, decarboxylates to produce dimethyl 3,5-dihydroxyhomophthalate IV. Reaction with benzyl chloride gives dimethyl 3,5-bis(benzyloxy)homophthalate V.

By a new reaction the foregoing homophthalate derivative is reacted with 4-benzyloxybutyraldehyde in the presence of sodium hydride and in the absence of air to give on acidification a mixture of the two compounds 6-(5-benzyloxy-1-carbomethoxy-1-penten-1-yl)-2,4 - bis(benzyloxy)benzoic acid VI and 3-(3-benzyloxypropyl)-4-carbomethoxy-6,8-bis(benzyloxy) - 3,4 - dihydroisocoumarin. This mixture is then treated successively with sodium methylate and dilute hydrochloric acid to give an essentially quantitative yield of 6-(5-benzyloxy - 1 - carbomethoxy-1-penten-1-yl) - 2,4 - bis(benzyloxy)benzoic acid VI. After hydrolyzing the foregoing compound the resulting acid, VII, is heated in a menstruum of dimethyl sulfoxide to produce 2,4-bis(benzyloxy)-6-(benzyloxy-1-penten-1-yl)benzoic acid VIII. In order for VII to decarboxylate into VIII under these conditions it is necessary that part of VII be converted to its acid salt with sodium hydroxide. A mixture of VII and its acid salt satisfactory for decarboxylation contains from about 2% by weight to about 4% by weight of sodium.

The benzoic acid derivative VIII is reacted with thionyl chloride to form the acid chloride which is reacted in turn with the alcohol, 5-chloro-2-pentanol, to yield 4-chloro-1-methylbutyl 2,4 - bis(benzyloxy)-6-(5-benzyloxy-1-penten-1-yl)benzoate IX. The benzoate ester is then reduced catalytically with hydrogen to give 4-chloro - 1 - methylbutyl 2,4 - dihydroxy-6-(5-hydroxypentyl)benzoate X. On reaction with benzyl chloride, this benzoate ester yields 4-chloro-1-methylbutyl 2,4-bis(benzyloxy)-6-(5-hydroxypentyl)benzoate XI. Treatment of the above compound with thionyl chloride produces 4-chloro-1-methylbutyl 2,4-bis(benzyloxy)-6-(5-chloropentyl)benzoate XII.

Reaction of the foregoing benzoate ester with sodium cyanide in a menstruum of dimethyl sulfoxide produces 4-cyano-1-methylbutyl 2,4-bis(benzyloxy)-6-(5-cyanopentyl)-benzoate XIII which on treatment with methanol and hydrochloric acid gives 4-carbomethoxy-1-methylbutyl 2,4-bis(benzyloxy) - 6 - (5-carbomethoxypentyl)benzoate XIV.

A ring closure is effected in the foregoing benzoate ester by a new reaction which depends on the use of the reagent sodium bis(trimethylsilyl)amide. Two compounds are formed in this reaction namely, (R,S)-5' - carbomethoxy-2,4-bis(benzyloxy)zearalanone and (R,S)-7' - carbomethoxy-2,4-bis(benzyloxy)zearalanone XV.

A mixture of the above two compounds is treated with alcoholic potassium hydroxide and then with strong hydrochloric acid solution to give the 2,4-bis(benzyloxy) ether of (R,S)-zearalanone XVI. By catalytic hydrogena-

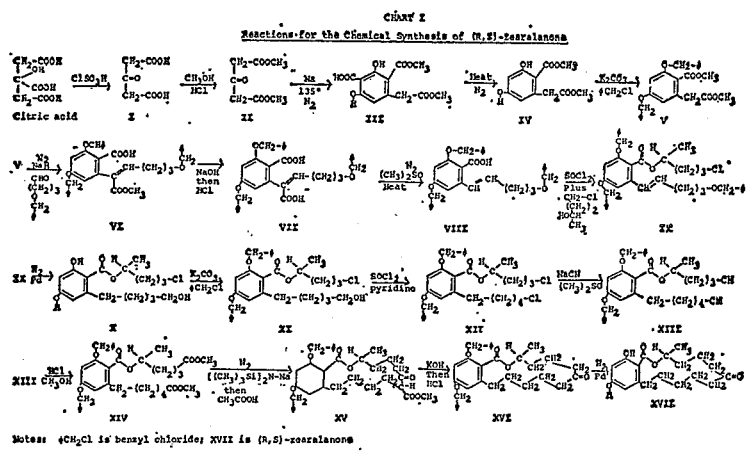

CHART I
Reactions for the Chemical Synthesis of (R,S)-Zearalanone

Notes: φCH₂Cl is benzyl chloride; XVII is (R,S)-zearalanone tion, the benzyl groups are replaced by hydrogen atoms and (R,S)-zearalanone, XVII, is obtained.

The abbreviations used in the following examples are described in these paragraphs. The description of a nuclear magnetic resonance (NMR) scan is identified by the letters NMR followed by the solvent and reference substance placed in parenthesis; thus, NMR (CDCl₃, TMS) means that the scan was made with deuterated chloroform as the solvent and tetramethylsilane as the reference substance. The position of the identified peaks may be described by the value:

$\delta$ = cycles per second from TMS divided by sixty. (This relation applies with a 60 megaherz instrument.)
$\delta$ = c.p.s. ÷ 60
or by $\tau$ = ten minus $\delta$ (10 − $\delta$)

The type of peak is shown by the first letter of the word describing the peak and is followed by a numeral indicating the number of hydrogen atoms involved. Examples are as follows:

s,1=singlet, one hydrogen
s,2=singlet, two hydrogens
d,1=doublet, one hydrogen
t,2=triplet, two hydrogens
m,4=multiplet, four hydrogens
broad s,1=a broad singlet for one hydrogen which may result from O$\underline{H}$, COO$\underline{H}$, C$\underline{H}$O Coupling constants are valuable for identification of the positions of hydrogen atoms and with respect to variations of the electronic environments. The coupling constants are measured as the distance between the peaks in question on the x-axis of the scan and are recorded as J values in terms of c.p.s.

Cycles per second are denoted by c.p.s. and by Hz.
In all of the examples, the temperatures are in degrees centigrade. In the NMR data, TMS is tetramethylsilane; DSS is sodium 2,2-dimethyl-2-silapentane-5-sulfonate.

The following examples serve to illustrate the invention and set forth the best mode contemplated by the inventors for carrying out the invention.

EXAMPLE 1

This example shows the preparation of β-oxoglutaric acid from citric acid under the influence of either of the strongly dehydrating acids chlorosulfonic or fuming sulfuric.

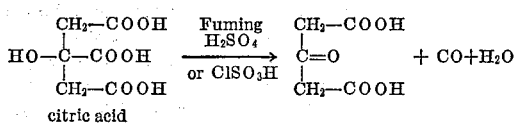

citric acid

β-Oxoglutaric acid, I

The procedure is given in "Organic Syntheses," Collective Vol. I, pp. 10–12, John Wiley and Sons, Inc., 1941.

The use of chlorosulfonic acid is disclosed in German Pat. No. 1,160,841 by Fritz Gerner assigned to C. H. Boehringer Sohn and published July 16, 1964. Yields are stated to be 90–91% of theory.

EXAMPLE 2

Example 2 shows the preparation of the dimethyl ester of β-glutaric acid.

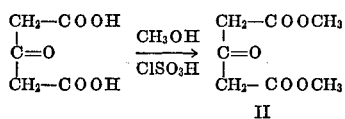

Dimethyl β-oxoglutarate, II

Methanol (345 g.) was added to the reaction mixture prepared in Example 1, while maintaining the temperature at 30° C. This required good cooling as the addition was quite exothermic. After two hours of additional stirring, 150 ml. of chloroform, and 360 g., of crushed ice were added to cause separation of an organic liquid phase. The aqueous phase was extracted with cold chloroform. The organic layer and extracts were combined and washed with water, then dried over sodium sulfate. The product, dimethyl β-oxoglutarate, was obtained in 80% yield upon distillation at 131° (12 mm.). Reference: German Pat. 1,160,841 issued July 16, 1964 to C. H. Boehringer Sohn.

EXAMPLE 3

This example shows the conditions for the condensation of dimethyl β-oxoglutarate, II, to produce two different dihydroxyhomophthalate derivatives.

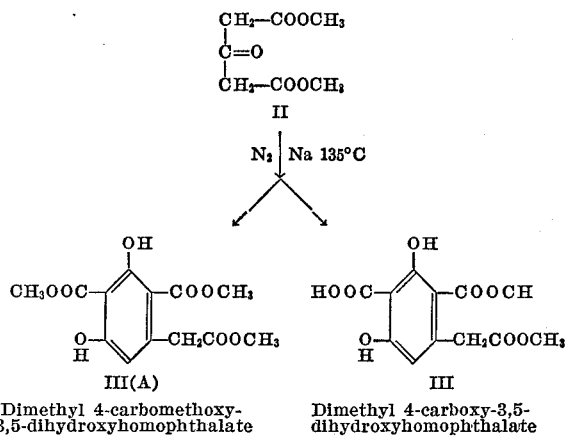

Dimethyl 4-carbomethoxy-3,5-dihydroxyhomophthalate     Dimethyl 4-carboxy-3,5-dihydroxyhomophthalate Dimethyl β-oxoglutarate, 100.0 g. (0.575 mole) was introduced into a reaction kettle provided with an efficient, high speed stirrer, an air-cooled reflux condenser, a nitrogen line, and efficient means to cool and heat the kettle and its contents. After a nitrogen atmosphere was established, 3.0 g. (0.13 g. atom) of finely cut, fresh sodium was added portionwise to the well stirred contents of the kettle. This addition was found to be quite exothermic. By cooling and controlling the rate of addition, the temperature was held below 120°.

External heating was applied upon completion of this addition, and the temperature of the stirred reaction solution maintained at 130–135°. Within about 45 minutes, the mixture became opaque and began to solidify. Heating and stirring were discontinued, and the reaction mixture cooled, to give 76 g. of solid yellow material. This solid was crystallized from methanol to give 23 g. of solid, m.p. 220° (dec.). This solid was extracted with 500 ml. of hot water to leave a residue of 7.5 g. of water-insoluble triester III(A), m.p. 135°. From evaporation of the foregoing methanolic filtrate an additional 5.0 g. of III(A) was realized. The above aqueous extract was acidified with dilute hydrochloric acid to precipitate 11.0 g. of diester III, m.p. 148°. Acidification of the spent methanolic liquors gave an additional 8.0 g. of III. In all, 19.0 g. (23.2%) of III and 12.5 g. (14.5%) of III(A) were obtained. After recrystallization from methanol III(A) melted at 144° and III at 153°.

Compound III is the desired compound produced in the condensation of Compound II. In order to get the highest yield of III, it was found to be necessary to use sodium in the amount of about 3% by wt. of starting compound II.

Triester III(A) exhibited the following NMR (CDCl₃) spectrum: δ 3.69 (s, 3, —OC$\underline{H}$₃),

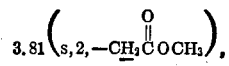

3.90 (s, 3, —OC$\underline{H}$₃); 4.03 (s, 3, —OC$\underline{H}$₃), 6.39 (s, 1, aromatic $\underline{H}$), 11.88 (s, 1, phenolic O$\underline{H}$), 12.81 (s, 1, phenolic O$\underline{H}$).

Diester III exhibited the following NMR (CDCl₃) spectrum: δ 3.74 (s, 3, —OC$\underline{H}$₃),

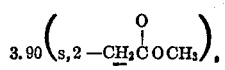

3.97 (s, 3, —OC$\underline{H}_3$), 6.50 (s, 1 aromatic $\underline{H}$), 10.16–10.50 (1 phenolic O$\underline{H}$), 12.21 (s, 1 phenolic O$\underline{H}$),

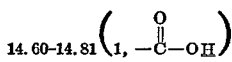

*Analysis.*—Calcd. for $C_{12}H_{12}O_8$ III: C, 50.70; H, 4.22; N.E., 284. Found: C, 51.02; H, 4.42; N.E., 277.

EXAMPLE 4

Example 4 gives details of the procedure for decarboxylating dimethyl 4-carboxy-3,5-dihydroxyhomophthalate, III, to produce dimethyl 3,5-dihydroxyhomophthalate, IV.

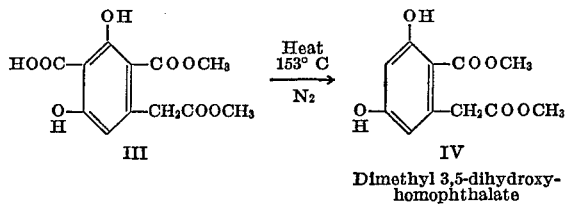

Dimethyl 3,5-dihydroxy-
homophthalate

A solution of dimethyl 4-carboxy-3,5-dihydroxyhomophthalate III (50.0 g., 0.12 mole) in 150 ml. of dimethylformamide was refluxed under nitrogen for thirty minutes. On cooling, the mixture was diluted with one liter of water, and the whole extracted seven times with 250 ml. portions of ether. The combined ether extracts were washed three times with 250 ml. portions of water, then dried over magnesium sulfate. Removal of ether under reduced pressure gave 29.0 g. (70%) of crude IV which was purified by chromatographic separation on 300 g. of 100–200 mesh Florisil® with chloroform. This treatment resulted in 17.0 g. (40%) of III, m.p. 144–5°; NMR (acetone-$d_6$) δ 3.66 (s, 3, —OC$\underline{H}_3$), 3.87 (s, 5, benzylic C$\underline{H}_2$ and —OC$\underline{H}_3$), 6.38 (s, 2, 2 aromatic $\underline{H}$), 9.3 (broad s, 1, O$\underline{H}$), 11.55 (s, 1, H-bonded —O$\underline{H}$).

*Analysis.*—Calcd. for $C_{11}H_{12}O_6$: C, 55.00; H, 5.00. Found: C, 54.92; H, 5.13.

From the aqueous wash of the above ether extracts needle-like crystals precipitated on standing overnight. The precipitate was collected, dissolved in warm water, and the solution filtered. The filtrate was acidified with dilute hydrochloric acid to give a yellow solid. This material was recrystallized from methanol to give 5.00 g. of III, m.p. 153–5°.

IV was also obtained by heating to 160° for 45–60 minutes a solution of III (6.90 g.) in 40 ml. of dimethyl sulfoxide. By the end of the heating period $CO_2$ evolution had ceased. On cooling, the mixture was diluted with 400 ml. of water and the whole extracted four times with 150 ml. portions of ether. After the extracts were washed and dried and the ether removed, 3.8 g. (64%) of crude pasty IV was obtained. This was recrystallized from benzene-hexane to give 1.2 g. of IV, m.p. 144–5°.

EXAMPLE 5

Example 5 exhibits the conditions needed for the reaction of dimethyl 3,5-dihydroxyhomophthalate, IV, with benzyl chloride to produce dimethyl 3,5-bis(benzyloxy)-homophthalate, V.

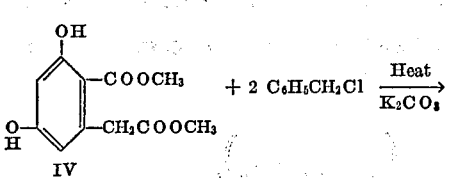

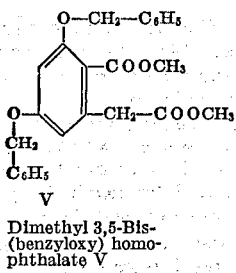

Dimethyl 3,5-Bis-
(benzyloxy) homo-
phthalate V

Dimethyl 3,5-1dihydroxyhomophthalate (1.2 g., 0.005 mol), benzyl chloride (2.35 ml., 0.02 mol) and anhydrous potassium carbonate (2.0 g., 0.0146 mol) were mixed with 25 ml. of dry methyl ethyl ketone. The mixture was refluxed for 72 hrs., and then the solvent was removed under reduced pressure. The residue was treated with water, and the aqueous mixture was extracted with ether. From evaporation of the dried ether extract was obtained an oil that crystallized on trituration with methanol to yield 0.65 g. (33%) of pure V, m.p. 85–86°.

*Analysis.*—Calcd. for $C_{25}H_{24}O_6$: C, 71.33; H, 5.71. Found: C, 70.94; H, 5.96.

EXAMPLE 6

Example 6 discloses a new reaction in which dimethyl 3,5-bis(benzyloxy)homophthalate, V, is reacted with an aldehyde represented by the formula:

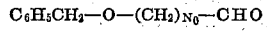

$$C_6H_5CH_2-O-(CH_2)_{N_0}-CHO$$

where $N_0$ is an integer which may have the value 1, 2, 3, 4, 5, or 6. The reaction is carried out under the influence of sodium hydride in an atmosphere of nitrogen.

When $N_0$ is 3 in the foregoing formula, the aldehyde is 4-benzyloxybutyraldehyde and the product formed is 6-(5-benzyloxy-1-carbomethoxy - 1-penten-1-yl)-2,4-bis-(benzyloxy)benzoic acid, VI.

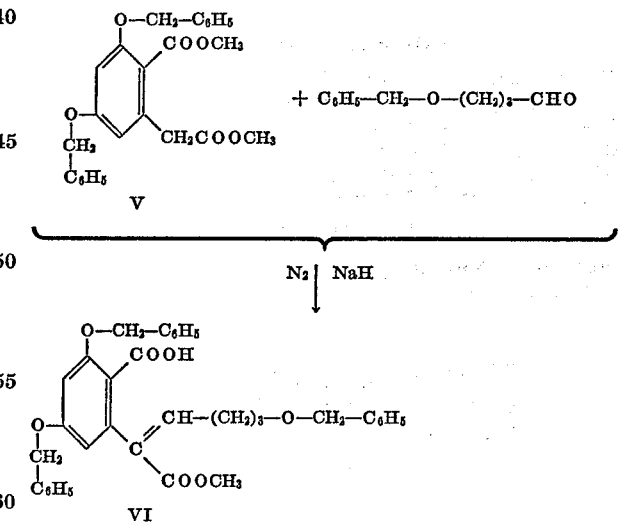

6-(5-Benzyloxy-1-carbomethoxy-1-penten-1-yl)-2,4-bis
benzyloxy)benzoic acid VI 6-(5-benzyloxy - 1 - carbomethoxy-1-penten-1-yl)-2,4-bis(benzyloxy)benzoic acid VI: A soluiton of V (6.72 g., 0.016 mol), 53.3% sodium hydride (0.720 g., 0.016 mol) and anhydrous ethanol (0.184 g., 0.004 mol) in 20 ml. of dry benzene under nitrogen was added dropwise in 10 minutes to a solution of 4-benzyloxybutyraldehyde (2.85 g., 0.016 mol) in 10 ml. of dry benzene. After stirring overnight at room temperature, 50 ml. of water was added. The aqueous phase was separated, washed with ether, and then acidified (dil. HCl) to precipitate a quantitative yield (9.00 g.) of a paste. This paste was a mixture of V and the corresponding 3,4-dihydroisocoumarin, 3-(3-benzyloxypropyl)-4 - carbomethoxy-6,8-bis(benzyloxy)-3,4-dihydroisocoumarin.

It is necessary to have ethanol, or a similar alkanol, in the foregoing anhydrous reaction mixture in order to get good yields. If the ratio of ethanol to aldehyde is lowered from 0.004/0.016 to 0.002/0.016, the yield of condensation products is cut almost in half. Since the yield of condensation products is essentially quantitative at a ratio of 0.004/0.016, an increase in the amount of ethanol above this ratio is not indicated.

In order to convert the 3,4-dihydroisocoumarin into VI, the paste was dissolved in 60 ml. of anhydrous methanol, 0.865 g. (0.016 mol) of sodium methoxide was added, and the resulting mixture was refluxed overnight. After cooling, it was acidified (dil. HCl). Methanol was removed under reduced pressure, and the paste that remained was extracted with ether. The extract was dried (MgSO$_4$), and removal of ether gave 8.36 g. (92.2%) of VI as a paste.

*Analysis.*—Calcd. for C$_{35}$H$_{34}$O$_7$: C, 74.20; H, 6.00. Found: C, 73.97; H, 6.36.

The structure of the 3,4-dihydroisocoumarin is shown below:

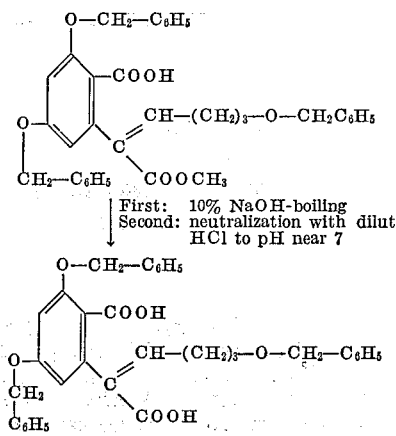

4-benzyloxybutyraldehyde for use in the above preparation was readily prepared from tetrahydrofurfuryl alcohol by its conversion to 1,2,5-pentanetriol, acetalization of the vincinal hydroxyl groups, benzylation of the 5-hydroxy function, hydrolysis of the acetal, and oxidative cleavage with lead tetraacetate. See C. L. Wilson, *J. Chem. Soc.,* 48 (1945), and R. Paul and S. Tchelitcheff, *Bull. Soc. Chim. Fr., /5/* 15, 197 (1948).

EXAMPLE 7

Example 7 teaches how the compound 6 - (5 - benzyloxy - 1 - carbomethoxy - 1 - penten-1-yl)-2,4-bis(benzyloxy)benzoic acid can be converted into α-(4-benzyloxybutylidene)-3,5-bis(benzyloxy)homophthalic acid.

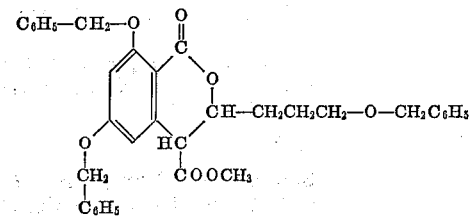

α-(4-benzyloxybutylidene) - 3,5 - bis(benzyloxy)homophthalic acid, VII: α-(4-benzyloxybutylidene) - 3,5 - bis(benzyloxy)homophthalic acid VII: VI was hydrolyzed by boiling in 10% alkali for two hours followed by neutralization with dilute HCl to a pH near 7. Compound VII was obtained as a paste in quantitative yield. The paste contained about 0.7 gram atom of sodium per mole of VII. By gravimetric and flame photometric analysis the product assayed 2.0% sodium by weight.

EXAMPLE 8

This example shows how the compound α-(4-benzyloxybutylidene)-3,5-bis(benzyloxy)homophthalic acid, VII, can be de-carboxylated by heating at about 155° C. to produce 2,4-bis(benzyloxy) - 6 - (5 - benzyloxy-1-penten-1-yl)benzoic acid, VIII.

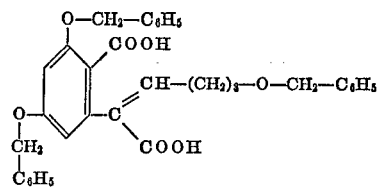

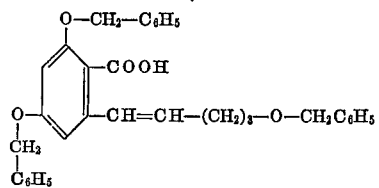

2,4 - bis(benzyloxy) - 6 - (5 - benzyloxy-1-penten-1-yl)-acid, VIII: A solution of α-(4-benzyloxybutylidene)-3,5-dibenzyloxyhomophthalic acid VII (6.5 g.) in 40 ml. of dimethyl sulfoxide was heated to 155° under nitrogen for thirty minutes. On cooling and dilution with 125 ml. of water, the mixture was extracted thrice with 50 ml. portions of ether. The combined ether extracts were thrice washed with 50 ml. portions of water, dried (MgSO$_4$), and ether removed to leave 5.58 g. (94%) of red oily VIII that solidified on standing. This material was purified by chromatographic separation using 170 g. of Silicar-CC-7® with chloroform to give 4.75 g. (80%) of VIII; NMR (CDCl$_3$) δ 1.5–2.5 (m, 4, =CH—C$\underline{H}_2$C$\underline{H}_2$CH$_2$—O—), 3.5 (t, 2, —CH$_2$C$\underline{H}_2$OCH$_2$—C$_6$H$_5$), 4.46 (s, 2, aliphatic —OCH$_2$C$_6$H$_5$), 4.96–5.00 (d, 4, 2 aromatic —OC$\underline{H}_2$C$_6$H$_5$), 6.1–6.7 (m, 4, 2 aromatic $\underline{H}$, and —C$\underline{H}$=C$\underline{H}$—), 7.2–7.32 (d, 15, three —OCH$_2$C$_6$$\underline{H}_5$), 9.58 (broad s, 1, —COO$\underline{H}$).

*Analysis.*—Calcd. for C$_{33}$H$_{32}$O$_5$: C, 77.95; H, 6.30. Found: C, 78.28; H, 6.47.

Compound VIII was also prepared by refluxing a solution of VII (0.50 g.) in 10 ml. of dimethylformamide for thirty minutes under nitrogen. On cooling and dilution with 50 ml. of water, the mixture was extracted thrice with 25 ml. portions of ether. The combined ether extracts were washed thrice with 25 ml. portions of water, dried (MgSO$_4$), and the ether removed to give 0.36 g. (80%) of VIII with the same physical characteristics as above.

It was found that when Compound VII was purified to the point where it contained no detectable sodium, the de-carboxylation reaction would not occur.

EXAMPLE 9

In Example 9 the compound,

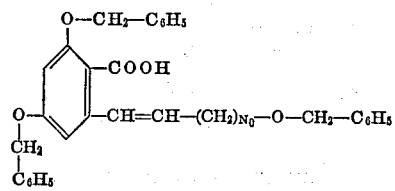

where N$_0$ is an integer which may have the value 1, 2, 3, 4, 5, or 6, is first reacted with thionyl chloride to produce the compound,

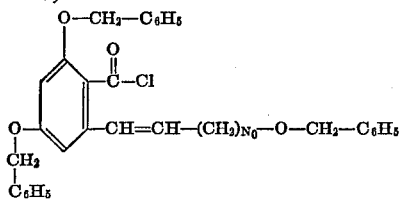

The foregoing acid chloride is then reacted with a chloroalkanol represented by the formula:

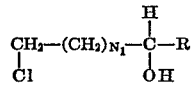

where $N_1$ is an integer which may have the value 0, 1, 2, 3, 4 or 5 and where R may be methyl, ethyl, isopropyl, or propyl to give compounds represented by the formula

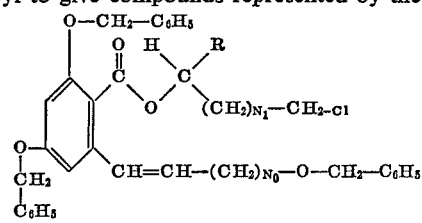

where $N_0$, $N_1$, and R have the meanings assigned in this example.

In the reactions shown below the compound 2,4-bis-(benzyloxy) - 6 - (5 - benzyloxy - 1 - penten-1-yl)benzoic acid, VIII, is reacted with thionyl chloride to produce 2,4-bis(benzyloxy) - 6 - (5-benzyloxy-1-penten-1-yl)benzoyl chloride. This acid chloride is then reacted with alcohol, 5-chloro-2-pentanol, to produce 4-chloro-1-methylbutyl, 2,4-bis(benzyloxy)-6-(5-benzyloxy - 1 - penten - 1-yl)benzoate, IX.

Secondary halo alcohols, such as 5-chloro-2-pentanol, are known to have the (S)-configuration at the asymmetric carbon atom when dextrorotatory and to have the (R)-configuration when levorotatory. Hence, the use of (—)-5-chloro-2-pentanol in the foregoing reaction will give (R)-zearalonone, and the use of (+)-5-chloro-2-pentanol will give (S)-zearalanone.

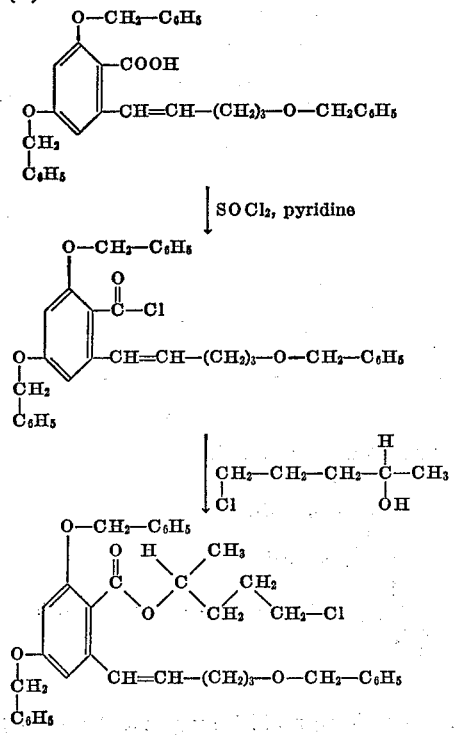

4-chloro-1-methylbutyl 2,4 - bis(benzyloxy) - 6 - (5-benzyloxy-1-penten-1-yl)benzoate IX: To a solution of VIII (2.03 g., 4 mmole) in 20 ml. of dry benzene were added thionyl chloride 0.960 g., 8 mmole) and 12 drops of pyridine. The mixture was stirred overnight, pyridine hydrochloride filtered off and benzene and thionyl chloride removed under high vacuum to give a viscous red paste.

The paste contained 2,4-bis(benzyloxy)-6-(5-benzyloxy-1-penten-1-yl)benzoyl chloride formed by the reaction of thionyl chloride on VIII. To this paste was added 5-chloro-2-pentanol (1.4 g., 10 mmole) in 20 ml. of dry benzene. The mixture was stirred overnight, the solvent removed under reduced pressure, and the thick red liquid that remained was chromatographed to give 1.75 g. (73%) of IX as a red paste; NMR (CDCl$_3$) δ 1.18–1.29 (d, 3, >CHCH$_3$), 1.50–2.50 (m, 8, —CH$_2$—CH$_2$—CH$_2$Cl, and —CH$_2$CH$_2$—CH$_2$OCH$_2$C$_6$H$_5$), 3.15–3.6 (m, 4,

—CH$_2$OCH$_2$C$_6$H$_5$ and —CH$_2$Cl), 4.45 (s, 2, aliphatic —OCH$_2$C$_6$H$_5$), 4.95 (d, 4, 2 aromatic —OCH$_2$C$_6$H$_5$), 6.00–6.35 (m, 2, —CH=CH—), 6.42 (J=2 cps., 1, aromatic H), 6.62 (J= 2 cps., 1, aromatic H), 7.3 (d, 15, 3 —OCH$_2$C$_6$H$_5$).

*Analysis.*—Calcd. for C$_{38}$H$_{41}$ClO$_5$: Cl, 5.80. Found: Cl, 5.71.

The 5-chloro-2-pentanol used in this preparation may be suitably prepared as described by R. C. Elderfield *et al., J. Am. Chem. Soc.* 68, 1579 (1946).

EXAMPLE 10

Example 10 shows how the benzyloxy groups of the compound 4-chloro-1-methylbutyl 2,4 - bis(benzyloxy)-6-(5-benzyloxy-1-penten-1-yl)benzoate, IX, can be removed by catalytic hydrogenation using palladium on charcoal as a catalyst.

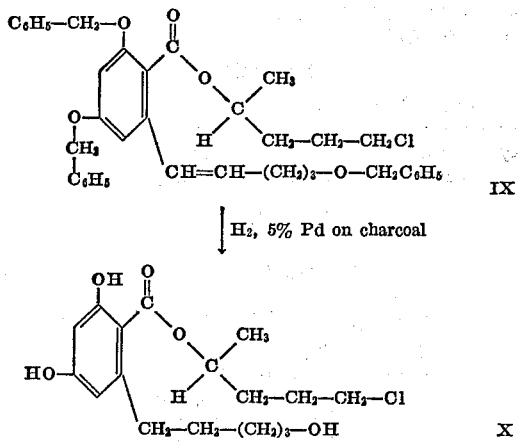

4-chloro-1-methylbutyl 2,4-dihydroxy - 6 - (5-hydroxypentyl)benzoate X: A mixture of IX (11.8 g., 0.02 mol) and 6.0 g. of 5% Pd/C catalyst in 200 ml. of ethanol was treated with hydrogen (1 atm., 21°). After the theoretical amount of hydrogen was taken up, the catalyst was removed, and the solution was concentrated under reduced pressure to give 6.0 g. (90%) of X.

*Analysis.*—Calcd. for C$_{17}$H$_{25}$ClO$_5$: C, 59.21; H, 7.25; Cl, 10.30. Found: C, 59.01; H, 7.21; Cl, 9.79.

EXAMPLE 11

In this example, the compound, 4-chloro - 1 - methylbutyl 2,4-dihydroxy - 6 - (5-hydroxypentyl)benzoate, X, is reacted with benzyl chloride in the presence of potassium carbonate to produce 4-chloro-1-methylbutyl 2,4-bis(benzyloxy) - 6 - (5-hydroxypentyl)benzoate, XI.

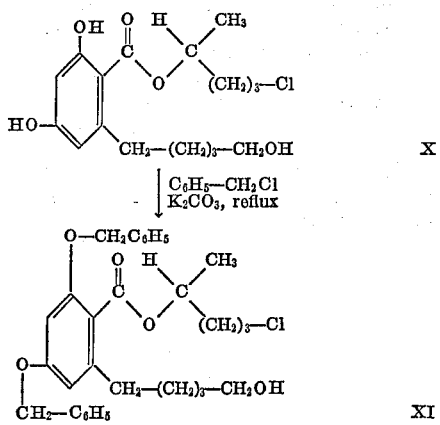

4-chloro - 1 - methylbutyl 2,4-bis(benzyloxy)-6-(5-hydroxypentyl)benzoate XI: A solution of X (7.00 g., 0.022 mol) in 150 ml. of methyl ethyl ketone, 6.00 g. (2.5 molar equivalents) of benzyl chloride and 6.00 g. of anhydrous $K_2CO_3$ was refluxed for 72 hours. Then, after cooling, 50 ml. of water was adde to the mixture, the ketone layer was separated, and the remaining aqueous layer was extracted twice with 75 ml. portions of chloroform. The ketone and chloroform fractions were combined and dried ($MgSO_4$). The solvents were removed to give 9.8 g. (82.6%) of XI as a paste.

*Analysis.*—Calcd. for $C_{31}H_{37}O_5Cl$: C, 70.94; H, 7.05; Cl, 6.76. Found: C, 71.00; H, 7.27; Cl, 6.61.

EXAMPLE 12

Example 12 shows how the compound, 4-chloro-1-methylbutyl 2,4-bis(benzyloxy) - 6 - (5-hydroxypentyl)-benzoate, XI, can be reacted with thionyl chloride to produce 4-chloro-1 - methylbutyl 2,4-bis(benzyloxy) - 6-(5-chloropentyl)-benzoate, XII.

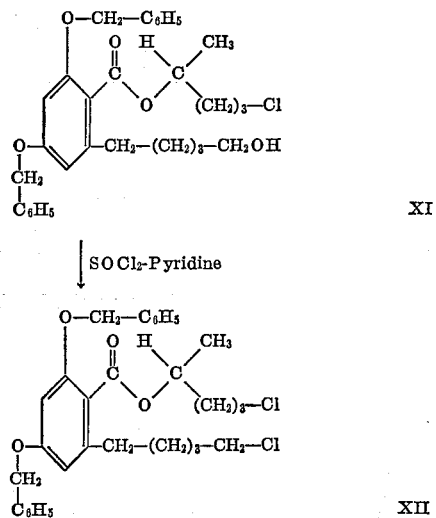

4-chloro - 1 - methylbutyl 2,4 - bis(benzyloxy)-6-(5-chloropentyl)benzoate XII: The chloroalcohol XI (10.59 g., 0.020 mole) was dissolved in 85 ml. of benzene together with 4.5 ml. of pyridine, the mixture was cooled, and 5.5 g. (0.0462 mole) of $SOCl_2$ was added dropwise to it. The reaction mixture was stirred overnight at room temperature. It was then treated with 50 ml. of water and the resulting mixture was washed successively with 5% HCl, 5% $NaHCO_3$ and water. After drying over $MgSO_4$, removal of benzene gave 11.76 g. of crude dichloride XII, which was purified by column chromatography on 150 g. of Florisil® with chloroform to give 9.67 g. of pure XII (89.2% yield).

*Analysis.*—Calcd. for $C_{31}H_{36}O_4Cl_2$: C, 68.50; H, 6.68; Cl, 13.05. Found: C, 68.15; H, 7.42; Cl, 13.70.

EXAMPLE 13

In Example 13 details are set forth on the conversion of 4 - chloro-1-methylbutyl 2,4-bis(benzyloxy)-6-(5-chloropentyl)benzoate, XII, by reaction with sodium cyanide into 4 - cyano-1-methylbutyl 2,4-bis(benzyloxy)-6-(5-cyanopentyl)-benzoate, XIII.

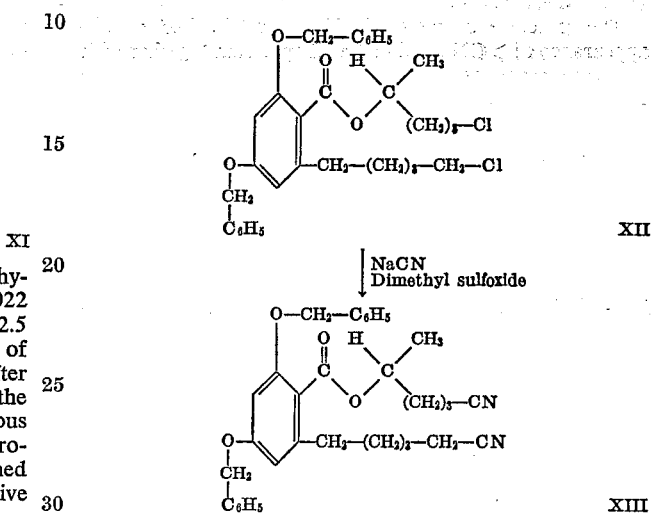

4 - cyano-1-methylbutyl 2,4-bis(benzyloxy)-6-(5-cyanopentyl)benzoate XIII: Dichloride XII (9.6 g., 0.18 mol) was dissolved in 20 ml. of dimethyl sulfoxide, and the solution was added dropwise to a solution of 8.50 g. (0.173 mole) of NaCN in 50 ml. of dimethyl sulfoxide that was warmed to 80°. After all the dichloride solution was added, the temperature was raised to 120° for 20 minutes, and then kept at 100° for overnight. The mixture was treated with 250 ml. of water, and extracted thrice with 200 ml. portions of ether. The ether extracts were washed with water, dried over $MgSO_4$. Removal of ether gave 9.46 g. of crude dinitrile XIII, which were purified by passing through 150 g. of Silicar-CC-4 with chloroform to obtain 7.85 g., (84.6%) of pure XIII.

*Analysis.*—Calcd. for $C_{33}H_{36}O_4N_2$: C, 75.57; H, 6.87; N, 5.34. Found: C, 75.14; H, 7.28; N, 4.71.

EXAMPLE 14

Example 14 gives the conditions needed to convert 4-cyano - 1 - methylbutyl 2,4-bis(benzyloxy)-6-(5-cyanopentyl)-benzoate, XIII, into 4 - carbomethoxy-1-methylbutyl 2,4-bis(benzyloxy) - 6 - (5-carbomethoxypentyl)benzoate, XIV.

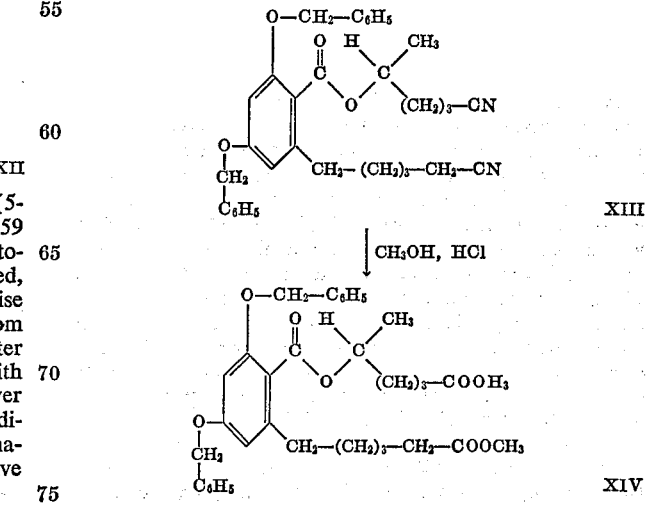

4 - carbomethoxy-1-methylbutyl 2,4-bis(benzyloxy)-6-(5-carbomethoxypentyl)benzoate XIV: Into 30 ml. of dry methanol, 7.00 g. of HCl gas were passed. Then dinitrile XIII (2.28 g., 0.00434 mol) was added, and the reaction mixture allowed to stand overnight. Water (280 ml.) was added, and the resulting mixture was extracted four times with 100 ml. portions of ether. The ether extracts were washed with 50 ml. of 5% NaHCO$_3$ and 5 ml. of water, then dried over MgSO$_4$. Removal of ether gave 2.23 g. (87%) diester XIV.

The structure of diester XIV was established by disappearance of >CN band in the IR spectrum together with the appearance of two —OCH$_3$ peaks at 3.60$\delta$ in the NMR spectrum.

EXAMPLE 15

In Example 15, there are presented details for carrying out a new reaction. In this reaction, 4-carbomethoxy-1-methylbutyl 2,4 - bis(benzyloxy)-6-(5-carbomethoxy-pentyl)benzoate, XIV is subjected to the reagent sodium bis(trimethylsilyl)amide which causes a ring closure in such a fashion as to yield a mixture of (R,S)-5'-carbomethoxy-2,4 - bis(benzyloxy)zearalanone and (R,S)-7'-carbomethoxy-2,4-bis(benzyloxy)zearalanone, XV.

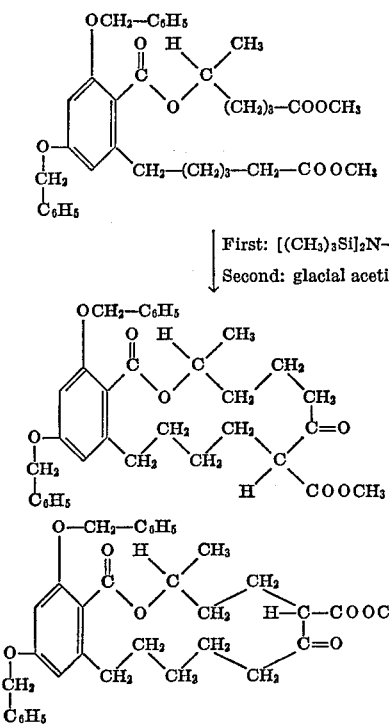

A mixture of (R,S)-5'-carbomethoxy-2,4-bis(benzyloxy)-zearalanone and (R,S)-7' - carbomethoxy - 2,4-bis (benzyloxy)-zearalanone, XV: To a refluxing ethereal solution of 3.44 g. (0.0188 mole) of sodium bis(trimethylsilyl)amide in 175 ml. of dry ether, a solution of 1.85 g. (0.00313 mole) of diester XIV in 260 ml. of dry ether was added continuously and uniformly over the period of eight hours (using Ziegler's high dilution technique). Then, it was refluxed for an additional 15 minutes, cooled and 25 ml. of glacial acetic acid was added. The resulting mixture was washed 3 times with 80 ml. portions of water, dried over MgSO$_4$, and ether removed to give 1.81 g. of crude XV as a paste. This was purified by passing it through 60.00 g. of a Silicar-CC-7 column with 100% CHCl$_3$ to obtain 1.33 g. of pure XV (77.7% yield).

The structure of XV was established by appearance of two carbonyl bands in the IR spectrum, one at 1725 cm.$^{-1}$ for ester carbonyl group and the other at 1700 cm.$^{-1}$ for ketone carbonyl. Its NMR spectrum had only one expected —OCH$_3$ peak at 3.60$\delta$.

Sodium bis(trimethylsilyl)amide was prepared from sodamide and hexamethyldisilazane (source: Aldrich Chemicals), following a procedure given by U. Wannagat and H. Niederprum, Chem. Ber., 94 (1961) 1540.

EXAMPLE 16

Example 16 depicts the conditions for the conversion of the mixture of (R,S)-5'carbomethoxy-2,4-bis(benzyloxy)-zearalanone and (R,S) - 7' - carbomethoxy-2,4-bis(benzyloxy)-zearalanone, XV, into the 2,4-bis(benzyloxy) ether of (R,S)-zearalanone.

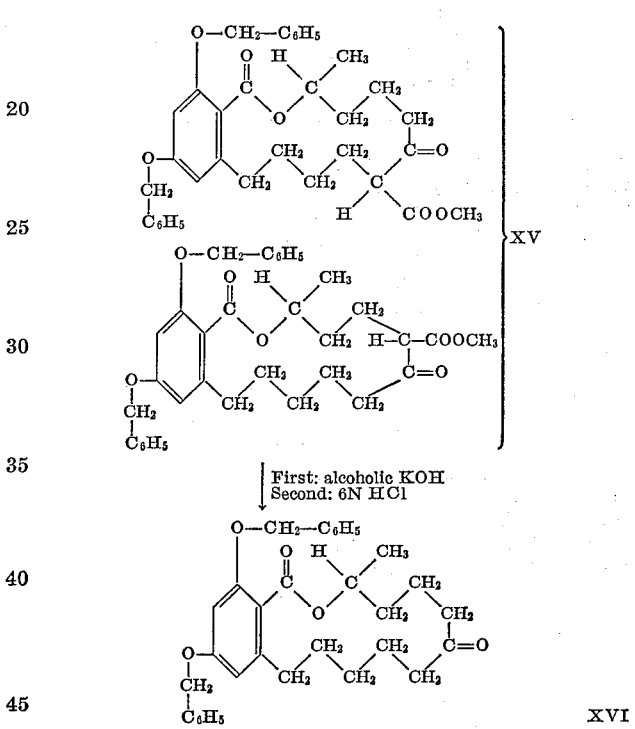

2,4 - bis(benzyloxy)ether of (R,S)-zearalanone, XVI: 1.5 g. of KOH was dissolved in a mixture of 3 ml. of water and 27 ml. of ethanol. A 7.5 ml. aliquot of this alcoholic KOH solution (containing 0.375 g. of KOH) was added to 200 mg. (0.339 mmole) of XV. The resulting mixture was refluxed for one hour, cooled and acidified with 6 N HCl. The acidified mixture was warmed to 50° for 10 minutes and diluted with 75 ml. of water. The diluted mixture was extracted thrice with 30 ml. portions of ether. The ether extracts were washed with 20 ml. of 5% NaHCO$_3$ and 20 ml. water, and dried. Removal of the ether gave 130 mg. (73%) of paste, which was purified by passing through 10.00 g. Silicar CC-7 with 100% CHCl$_3$ to give 100 mg. of pure paste. This paste crystallized slowly from methanol to give 90 mg. (53.1%) of white crystals, m.p. 104°. No depression in m.p. was observed with the natural authentic 2,4-dibenzyl ether of zearalanone. IR and NMR spectra of synthetic and natural material were identical and superimposable.

Analysis. — Calcd. for C$_{32}$H$_{36}$O$_5$: C, 76.76; H, 7.24. Found: C, 76.93; H, 7.43.

EXAMPLE 17

In Example 17, the final step in the chemical synthesis of (R,S)-zearalanone is portrayed. This step involves the treatment of the 2,4-bis(benzyloxy)ether of (R,S)-zearalanone, XVI, with hydrogen in the presence of a catalyst (5% palladium on charcoal) to give (R,S)-zearalanone, XVII.

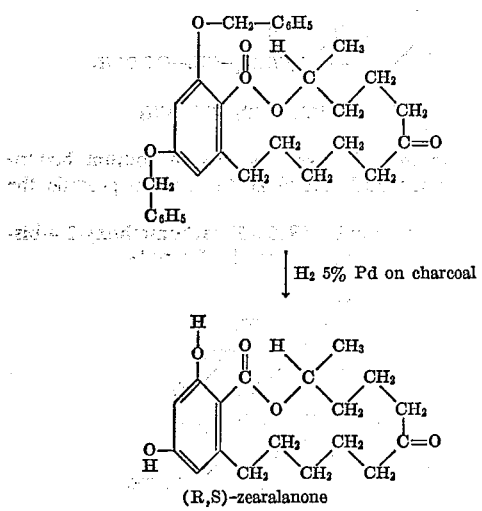

(R,S)-zearalanone, XVII: 2,4 - bis(benzyloxy)ether of (R,S)-zearalanone, XVI, (90 mg., 0.18 mmole), was dissolved in 15 ml. of ethyl acetate, and 75 mg. of 5% Pd/C was added to the solution. The mixture was subjected to atmospheric pressure hydrogenation until hydrogen uptake ceased. The catalyst was filtered off. Removal of the solvent gave a paste, which, upon recrystallization from isopropyl alcohol, yielded 40 mg. (69.5%) of racemic zearalanone XVII, m.p. 207–208.5°. These crystals were insoluble in acetone, methanol, CHCl$_3$ and water. The IR spectrum was identical with that of natural zearalanone.

Analysis.—Calcd. for $C_{18}H_{24}O_5$: C, 67.50; H, 7.553. Found: C, 67.67; H, 7.81.

The process of the present invention as illustrated by the foregoing examples has protected the hydroxyl groups of the resorcylic acid moiety by forming benzyl ethers in compounds, V, VI, VII, VIII, IX, XI, XII, XIII, XIV, XV, and XVI. It will be obvious to anyone skilled in the art that other protecting groups could be used in place of the benzyl group, for example, methyl, ethyl, butyl, cyclopentyl, cyclohexyl and the like. Also, in forming the acid chloride from compound VIII one skilled in the art could use acylating agents other than thionyl chloride, as for example the one illustrated by the reaction, $$RCOOH + (C_6H_5)_3P + CCl_4 \rightarrow RCOCl + (C_6H_5)_3PO + HCCl_3.$$

In effecting the reaction of 4-benzyloxybutyraldehyde with compound V, one could use in place of sodium hydride reagents such as sodium ethoxide, potassium tertiary-butoxide, sodium methoxide, and the like.

(R,S)-zearalanone and its homologues produced by the process of this invention are useful in promoting the growth rates of meat-producing animals. The compounds can be administered to animals by any suitable method including subcutaneous injection of pellets under the skin of the ears of mammals as well as by oral and parenteral administrations. For example, the compound can be formulated into pellets and put under the skin of the ear by a suitable gun or it can be suspended in a medium such as peanut oil and injected parenterally. The compound can also be blended with ordinary feed containing nutritional values in an amount sufficient to produce the desired rate of growth and can thus be fed directly to animals.

When the compound is to be fed directly to animals, the feed composition can be prepared containing the usual nutritionally balanced quantities of fats, carbohydrates, proteins, vitamins, and minerals together with zearalanone. Some of these usual dietary elements are grains, such as ground grain and grain by-products; animal protein substances such as those found in fish meal and meat scraps; animal and vegetable fats; vegetable proteins like soybean oil meal or peanut oil meal; vitaminaceous materials, e.g. vitamin A and D mixtures; riboflavin supplements and other vitamin B complex members; antibiotic supplements such as zinc bacitracin feed grade; and bone meal and limestone to provide minerals. A type of conventional feed material for use with cattle include alfalfa hay and ground corn cobs together with supplementary antibiotics and vitaminaceous materials if desired.

The amount of compound administered to the animal depends, of course, upon the specific animal, its age and sex, and the desired rate of growth. Usually, administration of from about 1 to about 100 mg. of the compound per animal per day achieves significantly increased growth rates.

We claim:
1. A compound of the formula

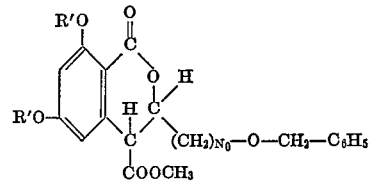

wherein $N_0$ is an integer having the value 1, 2, 3, 4, 5 or 6 and R' is selected from the group consisting of benzyl, methyl, ethyl, butyl, cyclopentyl, and cyclohexyl.

2. The compound of claim 1 wherein $N_0$ is 3.
3. The compound of claim 1 wherein R' is benzyl.
4. A method for preparing a compound of the formula

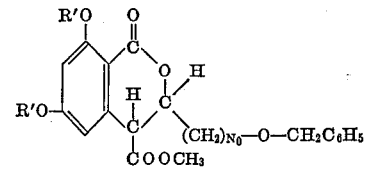

wherein $N_0$ is an integer having the value 1, 2, 3, 4, 5 or 6 and R' is selected from the group consisting of benzyl, methyl, ethyl, butyl, cyclopentyl, and cyclohexyl, comprising reacting a compound of the formula

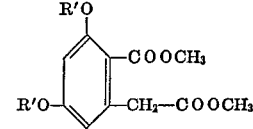

with an aldehyde of the formula

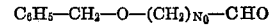

$$C_6H_5-CH_2-O-(CH_2)_{N_0}-CHO$$

at room temperature in an atmosphere substantially devoid of oxygen in a menstruum of anhydrous benzene in the presence of sodium hydride followed by acidification with a dilute mineral acid.

5. The method of claim 4 wherein $N_0$ is 3 and R' is benzyl.

6. A method for the preparation of a mixture of compounds represented by the formulas

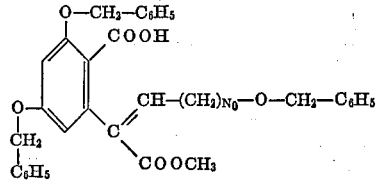

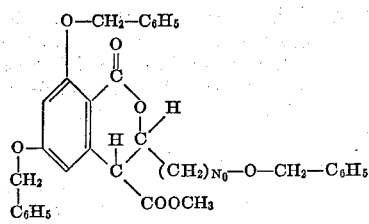

where $N_0$ is an integer which may have the value 1, 2, 3, 4, 5, or 6, comprising reacting dimethyl 3,5-bis(benzyloxy)-homophthalate with compounds represented by the formula

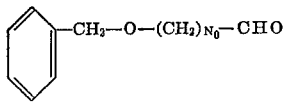

where $N_0$ is an integer which may have the value 1, 2, 3, 4, 5, or 6, at room temperature in an atmosphere substantially devoid of oxygen in a menstruum of anhydrous benzene in the presence of sodium hydride in an amount about equimolar with respect to the aldehyde and in the presence of ethanol in an amount about one-fourth of the aldehyde on a molar basis followed by acidification with a dilute mineral acid.

7. The method of claim 6 wherein $N_0$ is 3.
8. A compound selected from the group consisting of

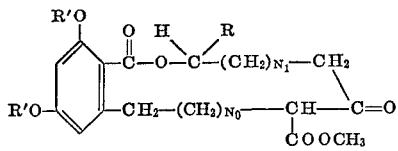

and

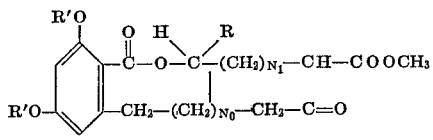

wherein $N_0$ is an integer having the value 1, 2, 3, 4, 5, or 6; $N_1$ is an integer having the value 0, 1, 2, 3, 4, or 5; R is methyl, ethyl, propyl or isopropyl; and R' is selected from the group consisting of benzyl, methyl, ethyl, butyl, cyclopentyl, and cyclohexyl.

9. The compound of claim 8 wherein R' is benzyl, $N_0$ is 3, and $N_1$ is 2.
10. A method of preparing a compound selected from the group consisting of

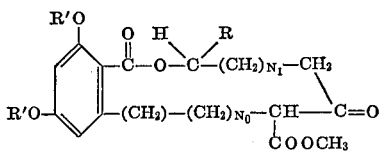

and

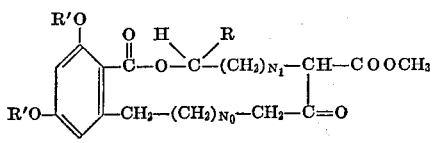

wherein $N_0$ is an integer having the value 1, 2, 3, 4, 5 or 6; $N_1$ is an integer having the value 0, 1, 2, 3, 4, or 5; R is methyl, ethyl, propyl, or isopropyl; and R' is selected from the group consisting of benzyl, methyl, ethyl, butyl, cyclopentyl, and cyclohexyl, comprising contacting a compound of the formula

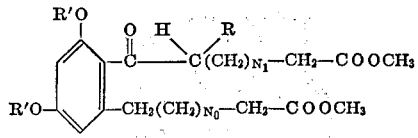

successively in the effective amounts of sodium bis(trimethylsilyl)amide and glacial acetic acid to provide the compound.

11. The compound (R,S)-5'-carbomethoxy-2,4-bis-(benzyloxy)-zearalanone having the formula

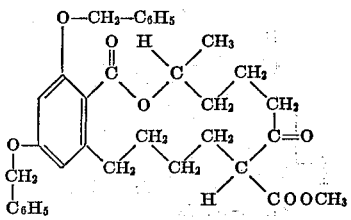

12. The compound (R,S)-7'-carbomethoxy-2,4-bis-(benzyloxy)-zearalanone having the formula

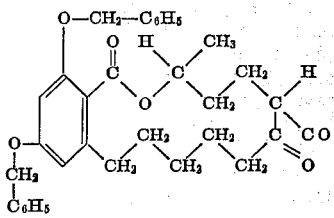

13. A method for the preparation of a mixture of (R,S)-5' - carbomethoxy - 2,3-bis(benzyloxy)zearalanone and (R,S) - 7'-carbomethoxy-2,4-bis(benzyloxy)zearalanone comprising reacting 4-carbomethoxy-1-methylbutyl 2,4 - bis(benzyloxy)-6-(5-carbomethoxypentyl)benzoate successively with sodium bis(trimethylsilyl)amide in a menstruum of dry ethyl ether at about 35° C. and with glacial acetic acid.

14. A method for the preparation of a mixture of the compound represented by the formulas

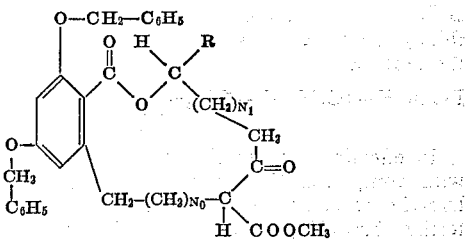

where $N_0$ is an integer which may have the value 1, 2, 3, 4, 5, or 6, where $N_1$ is an integer which may have the value 0, 1, 2, 3, 4, or 5, and where R may be methyl, ethyl, isopropyl, or propyl, and

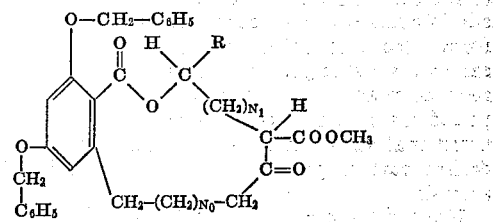

where $N_0$ is an integer which may have the value 1, 2, 3, 4, 5, or 6, where $N_1$ is an integer which may have the value 0, 1, 2, 3, 4, or 5, and where R may be methyl, ethyl, isopropyl, or propyl, comprising reacting compounds represented by the formula

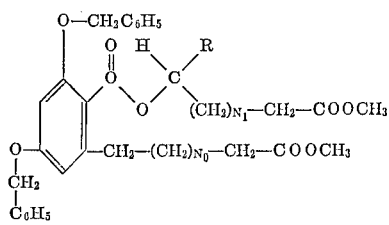

where $N_0$ is an integer which may have the value 1, 2, 3, 4, 5, or 6, where $N_1$ is an integer which may have the value 0, 1, 2, 3, 4, or 5, and where R may be methyl, ethyl, isopropyl, or propyl, successively with sodium bis-(trimethylsilyl)amide in a menstruum of dry ethyl ether at about 35° C. and with glacial acetic acid.

15. A method for the chemical synthesis of (R,S)-zearalanone which comprises the steps of:

(a) condensing dimethyl β-oxoglutarate using about three percent by weight metallic sodium in an atmosphere substantially devoid of oxygen at a temperature in the range 115–140° C. to prepare dimethyl 4-carboxy-3,5-dihydroxyhomophthalate;

(b) decarboxylating dimethyl 4-carboxy-3,5-dihydroxyhomophthalate by heating in a menstruum of dimethylformamide in an atmosphere substantially devoid of oxygen and at a temperature of about 150° C. to produce dimethyl 3,5-dihydroxyhomophthalate;

(c) reacting dimethyl 3,5-dihydroxyhomophthalate with benzyl chloride in the presence of potassium carbonate to prepare dimethyl 3,5-bis(benzyloxy)-homophthalate;

(d) reacting dimethyl 3,5-bis(benzyloxy)homophthalate with 4-benzyloxybutyraldehyde in the presence of sodium hydride and then acidifying with dilute mineral acid to give a mixture of 6-(5-benzyloxy-1-carbomethoxy - 1 - penten-1-yl)-2,4-bis(benzyloxy)-benzoic acid and 3-(3-benzyloxypropyl)-4-carbomethoxy - 6,8 - bis(benzyloxy)-3,4-dihydroisocoumarin;

(e) reacting a mixture of 6-(5-benzyloxy-1-carbomethoxy-1-penten-1-yl)-2,4-bis(benzyloxy)benzoic acid and 3 - (3-benzyloxypropyl)-4-carbomethoxy-6,8-bis(benzyloxy)-3,4-dihydroisocoumarin with the sodium methoxide in a methanol menstruum at about 65° C. followed by acidification with dilute mineral acid to prepare 6-(5-benzyloxy-1-carbomethoxy-1-penten-1-yl)-2,4-bis(benzyloxy)benzoic acid;

(f) reacting 6-(5-benzyloxy-1-carbomethoxy-1-penten-1-yl)-2,4-bis(benzyloxy)benzoic acid with boiling ten percent alkali followed by neutralization to a pH of about 7 to prepare α-(4-benzyloxybutylidene)-3,5 - bis(benzyloxy) - homophthalic acid containing about 2 to about 4% sodium;

(g) decarboxylating α - (4-benzyloxybutylidene)-3,5-bis(benzyloxy)homophahalic acid containing from about 2 to about 4% sodium by heating in an atmosphere substantially devoid of oxygen in a menstruum of dimethylsulfoxide at a temperature of about 155° C. to prepare 2,4-bis(benzyloxy)-6-(5-benzyloxy)-1-penten-1-yl)-benzoic acid, (h) reacting 2,4-bis(benzyloxy)-6-(5-benzyloxy-1-penten-1-yl)benzoic acid successively with thionyl chloride in the presense of pyridine and with 5-chloro-2-pentanol to prepare 4-chloro-1-methylbutyl 2,4-bis-(benzyloxy)-6-(5-benzyloxy-1-penten-1-yl)benzoate;

(i) reacting 4-chloro-1-methylbutyl 2,4-bis(benzyloxy) - 6 - (5-benzyloxy-1-penten-1-yl)benzoate with hydrogen at room temperature and under one atmosphere hydrogen pressure in the presence of a palladium on charcoal catalyst to prepare 4-chloro-1-methylbutyl 2,4 - dihydroxy - 6 - (5-hydroxypentyl)-benzoate;

(j) reacting 4-chloro-1-methylbutyl 2,4-dihydroxy-6-(5-hydroxypentyl)benzoate with benzyl chloride in the presence of potassium carbonate to prepare 4-chloro - 1 - methylbutyl 2,4-bis(benzyloxy)-6-(5-hydroxypentyl)benzoate;

(k) reacting 4-chloro-1-methylbutyl 2,4-bis(benzyloxy) - 6 - (5-hydroxypentyl)benzoate with thionyl chloride in the presence of pyridine to prepare 4-chloro-1-methylbutyl 2,4 - bis(benzyloxy)-6-(5-chloropentyl)benzoate;

(l) reacting 4-chloro-1-methylbutyl 2,4-bis(benzyloxy)-6-(5-chloropentyl)benzoate wth sodium cyanide in an atmosphere substantially devoid of oxygen in a menstruum of dimethylsulfoxide at a temperature of about 100° C. to prepare 4-cyano-1-methylbutyl 2,4 - bis(benzyloxy) - 6 - (5-cyanopentyl)-benzoate;

(m) reacting 4-cyano-1-methylbutyl 2,4-bis(benzyloxy)-6-(5-cyanopentyl)benzoate successively with anhydrous mineral acid, methanol, and then with water at room temperature to prepare 4-carbomethoxy-1-methylbutyl 2,4-bis(benzyloxy)-6-(5-carbomethoxypentyl)benzoate;

(n) reacting 4-carbomethoxy-1-methylbutyl 2,4-bis-(benzyloxy) - 6 - (5-carbomethoxypentyl)-benzoate with sodium bis(trimethylsilyl)-amide in a menstruum of diethyl ether at a temperature of about 35° C. to prepare a mixture of (R,S)-5'-carbomethoxy-2,4-bis(benzyloxy)zearalanone and (R,S)-7'-carbomethoxy-2,4-bis(benzyloxy)zearalanone;

(o) reacting a mixture of (R,S)-5'-carbomethoxy-2,4-bis(benzyloxy)zearalanone and (R,S)-7'-carbomethoxy - 2,4 - bis(benzyloxy)zearalanone successively with potassium hydroxide in a water-ethanol menstruum and a mineral acid to prepare the 2,4-bis-benzyloxy)ether of (R,S)-zearalanone;

(p) reacting the 2,4-bis(benzyloxy)ether of (R,S)-zearalanone with hydrogen in a menstruum of ethyl acetate in the presence of a palladium-on-charcoal catalyst at room temperature and under a hydrogen pressure of about one atmosphere to prepare (R,S)-zearalanone.

References Cited
UNITED STATES PATENTS 3,373,037   3/1968   Abbott _____ 260—343.2 F
3,551,455   12/1970  Girotra et al. ____ 260—343.2 F JOHN M. FORD, Primary Examiner U.S. Cl. X.R.

260—343.2 F, 473 R, 465 D, 521 R, 473 A, 544 M, 543 M; 424—279

UNITED STATES PATENT OFFICE
CERTIFICATE OF CORRECTION

Patent No. 3,839,363  Dated October 1, 1974

Inventor(s) DINUBHAI H. SHAH and RICHARD N. HURD

It is certified that error appears in the above-identified patent and that said Letters Patent are hereby corrected as shown below:

Column 1, the formula between lines 15 and 24, "Y" should appear as a subscript.

Column 2, the formula between lines 15 and 19, the "$N_1$" should appear as a subscript.

Column 2, line 48, "polysiologically" should appear as --physiologically--.

Column 2, the formula appearing between lines 63 and 70, "Y" should appear as a subscript and "X" should be in the upper case.

Column 4, line 3, --5-- -- should appear before "benzyloxy".

Column 6, line 63, "3.81" should appear in full size type a space away from the left hand parenthesis.

Column 6, the formula between lines 71 and 75 should appear as --3.90 (s,2 -C$\underline{H}_2$COCH$_3$)--.
$$\overset{O}{\underset{\|}{}}$$

Column 7, line 6, "14.60-14.81" should appear in full size type a space to the left of the left parenthesis.

Column 8, line 11, a comma should appear after "phthalate"

Column 8, line 12, "1" should not appear before "dihydroxyhomophthalate".

Column 8, line 65, "soluiton" should appear as --solution--.

Signed and sealed this 31st day of December 1974.

(SEAL)
Attest:

McCOY M. GIBSON JR.
Attesting Officer

C. MARSHALL DANN
Commissioner of Patents